United States Patent
Ohashi et al.

(10) Patent No.: US 10,211,475 B2
(45) Date of Patent: Feb. 19, 2019

(54) ELECTROLYTE MEMBRANE ROLL BODY

(71) Applicant: TOYOTA JIDOSHA KABUSHIKI KAISHA, Toyota-shi, Aichi-ken (JP)

(72) Inventors: Sozaburo Ohashi, Nagoya (JP); Kotaro Ide, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 537 days.

(21) Appl. No.: 14/965,977

(22) Filed: Dec. 11, 2015

(65) Prior Publication Data

US 2016/0181644 A1 Jun. 23, 2016

(30) Foreign Application Priority Data

Dec. 12, 2014 (JP) .................. 2014-252401

(51) Int. Cl.
*H01M 8/10* (2016.01)
*H01M 8/1086* (2016.01)
*H01M 8/1018* (2016.01)

(52) U.S. Cl.
CPC .. *H01M 8/1093* (2013.01); *H01M 2008/1095* (2013.01); *H01M 2300/0082* (2013.01); *Y02P 70/56* (2015.11)

(58) Field of Classification Search
CPC ............ H01M 8/1093; H01M 8/1086; H01M 8/1069; H01M 2008/1095; H01M 2300/0082; Y02P 70/56
See application file for complete search history.

(56) References Cited

U.S. PATENT DOCUMENTS

2013/0192750 A1  8/2013  Kiuchi

FOREIGN PATENT DOCUMENTS

| JP | 2009-043549 A | | 2/2009 | |
|---|---|---|---|---|
| JP | 2013-182682 | * | 9/2013 | .............. H01M 8/02 |
| KR | 10-2013-0001264 A | | 1/2013 | |

* cited by examiner

*Primary Examiner* — Raymond Alejandro
(74) *Attorney, Agent, or Firm* — Finnegan, Henderson, Farabow, Garrett & Dunner, LLP

(57) ABSTRACT

An electrolyte membrane roll body to be used in a manufacturing apparatus for membrane electrode assemblies allows effective use of an electrolyte membrane in the manufacturing apparatus. A first end of a lead film and a first end of a lead film supporting base that is peelably bonded to the lead film are connected to a roll core around which an electrolyte membrane sheet and a back sheet for supporting the electrolyte membrane sheet are rolled. A terminal end of the electrolyte membrane sheet and a terminal end of the back sheet are connected to a second end of the lead film and a second end of the lead film supporting base, respectively.

3 Claims, 5 Drawing Sheets

ELECTROLYTE MEMBRANE ROLL BODY

CROSS-REFERENCES TO RELATED APPLICATIONS

This application relates to and claims priority from Japanese Patent Application No. 2014-252401, filed on Dec. 12, 2014, the entire disclosure of which is incorporated herein by reference.

BACKGROUND

Field of the Invention

The invention relates to an electrolyte membrane roll body.

Description of Related Art

A membrane electrode assembly (MEA) used for fuel cells has an electrolyte membrane and anode and cathode catalyst layers (hereinafter also referred to as the "electrode catalyst layers" in some contexts) joined respectively to both surfaces of the electrolyte membrane, the catalyst layers supporting a catalyst for promoting a fuel cell reaction.

Such membrane electrode assembly is manufactured by, for example, a manufacturing apparatus described in JP2013-182682 A, which proposes a technique for overlaying a catalyst layer sheet (having a catalyst layer formed on a catalyst layer supporting base) that is continuously conveyed onto a belt-shaped electrolyte membrane sheet (having an electrolyte membrane formed on an electrolyte membrane supporting base) that is continuously conveyed, and transferring the catalyst layer onto the electrolyte membrane. In this technique, the transfer of the catalyst layer onto the electrolyte membrane and the subsequent peeling of the supporting bases (the electrolyte membrane supporting base and the catalyst layer supporting base) are performed sequentially.

In the manufacturing apparatus for membrane electrode assemblies described in JP2013-182682 A, a roll core of a roll (hereinafter also referred to as the "electrolyte membrane roll body" in some contexts), which has been formed by rolling up the electrolyte membrane, is directly connected to the electrolyte membrane and the electrolyte membrane supporting base. Due to the direct connection between the roll core of the roll and the electrolyte membrane, the catalyst layers (an anode-side catalyst layer and a cathode-side catalyst layer) cannot be sequentially transferred onto all of the electrolyte membrane that is unrolled from the roll. As a result, it is possible that some portion that cannot be used as a product may be disadvantageously produced.

During an attempt to solve this problem, the inventors of the present invention have discovered, instead of directly bringing the electrolyte membrane into contact with the roll core of the roll, the use of a lead film connected to the roll core of the roll and the rolling-up of the electrolyte membrane and the electrolyte membrane supporting base that are bonded to the lead film.

However, another problem still remained. Specifically, if the lead film connected to the roll core of the roll is formed from one layer, during the peeling of the electrolyte membrane supporting base connected to the lead film, it cannot be peeled at a connecting portion between the electrolyte membrane supporting base and the lead film, and the product cannot be conveyed any further from that point. Thus, it may not be possible to effectively use the electrolyte membrane that is left within equipment (within the manufacturing apparatus).

SUMMARY

The present invention has been made in light of the problems set forth above and an object of the invention is to provide an electrolyte membrane roll body, for use in a manufacturing apparatus for membrane electrode assemblies, which allows for effective use of an electrolyte membrane in the manufacturing apparatus.

In order to solve the problems set forth above, an electrolyte membrane roll body according to an aspect of the present invention is an electrolyte membrane roll body to be used in a manufacturing apparatus for membrane electrode assemblies that are formed by transferring an electrode catalyst layer onto at least one surface of a belt-shaped electrolyte membrane that is continuously conveyed, wherein a first end of a lead film and a first end of a lead film supporting base that is peelably bonded to the lead film are connected to a roll core around which the electrolyte membrane and an electrolyte membrane supporting base for supporting the electrolyte membrane are rolled; and a terminal end of the electrolyte membrane and a terminal end of the electrolyte membrane supporting base are connected to a second end of the lead film and a second end of the lead film supporting base, respectively.

Since the lead film and the lead film supporting base are provided as described above, the lead film supporting base can be peeled after the electrolyte membrane supporting base is peeled. As a result, the lead film can be left behind within equipment (within the manufacturing apparatus) and the electrolyte membrane that has been rolled up into the electrolyte membrane roll body can therefore be used effectively.

In the electrolyte membrane roll body according to the above aspect of the present invention, a peeling strength of the lead film supporting base relative to the lead film is preferably equal to or less than a peeling strength of the electrolyte membrane supporting base relative to the electrolyte membrane.

In the electrolyte membrane roll body according to the above aspect of the present invention, a total thickness of the lead film and the lead film supporting base is preferably substantially equal to a total thickness of the electrolyte membrane and the electrolyte membrane supporting base.

DETAILED DESCRIPTION OF PREFERRED EMBODIMENTS

An embodiment of the present invention will now be described below with reference to the attached drawings.

Although the present invention is described by means of the following preferred embodiment, the present invention can be modified by various techniques without departing from the scope of the present invention, and other embodiments than the following embodiment can be employed. Accordingly, all the modifications within the scope of the present invention will be encompassed in the scope of the claims.

<Manufacturing Apparatus for Membrane Electrode Assemblies>

Figure 1:
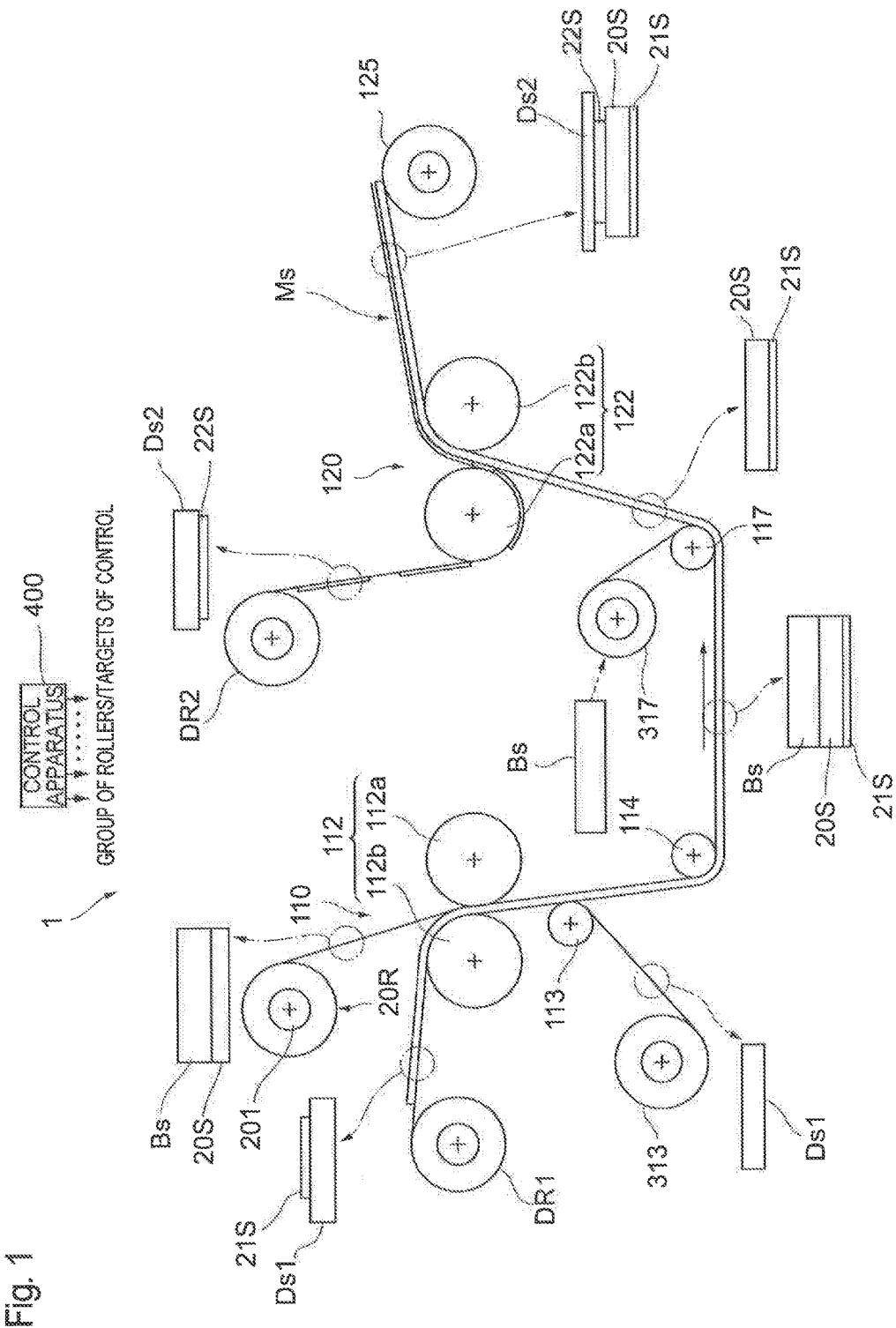
FIG. 1 is an explanatory diagram schematically showing a general configuration of a manufacturing apparatus for membrane electrode assemblies, as well as the forms of sheets at respective sections during conveyance.

First, a manufacturing apparatus for membrane electrode assemblies will be described, FIG. 1 is an explanatory diagram schematically showing a general configuration of a manufacturing apparatus for membrane electrode assemblies, as well as the forms of sheets at respective sections during conveyance.

FIG. 1 schematically shows how the sheets are conveyed and joined, as well as the forms of the sheets, but it does not reflect the thicknesses, widths and lengths of an actual electrolyte membrane sheet 20S, a first catalyst layer sheet 21S and a second catalyst layer sheet 22S. A lead film and a lead film supporting base of the present invention are not shown in FIG. 1 but will be described later with reference to FIGS. 3-5.

A manufacturing apparatus 1 for membrane electrode assemblies is an apparatus for fabricating membrane electrode assemblies (MEA) by transferring catalyst layers (electrode catalyst layers) onto both surfaces of an electrolyte membrane, respectively. More specifically, a membrane electrode assembly is fabricated by joining a first catalyst layer sheet 21S, which has been bonded to a first catalyst layer supporting sheet Ds1, onto one surface of a belt-shaped electrolyte membrane sheet 20S that has been bonded to a back sheet Bs, and joining a second catalyst layer sheet 22S, which has been bonded to a second catalyst layer supporting sheet Ds2, onto the other surface of the electrolyte membrane sheet 20S. The first catalyst layer sheet 21S and the second catalyst layer sheet 22S are electrode catalyst layer sheets that receive reactant gases and function as an anode (fuel electrode) and a cathode (oxidant electrode), respectively.

The manufacturing apparatus 1 for membrane electrode assemblies shown in FIG. 1 includes a first catalyst layer transfer mechanism 110 (first joining part), a second catalyst layer transfer mechanism 120 (second joining part) and a control apparatus 400.

The first catalyst layer transfer mechanism 110 includes a mechanism for transferring the first catalyst layer sheet 21S onto the electrolyte membrane sheet 20S. The first catalyst layer transfer mechanism 110 includes an electrolyte membrane sheet roll 20R (electrolyte membrane roll body), a first catalyst layer supporting sheet roll DR1, first transfer rollers 112, a first peeling roller 113, a first conveyance roller 114 and a second peeling roller 117, in such order from the upstream side.

The electrolyte membrane sheet roll 20R is rotated under the control of the control apparatus 400 so as to feed the electrolyte membrane sheet 20S along with the back sheet Bs toward the first transfer rollers 112. The electrolyte membrane sheet 20S is formed in an elongated shape on a sheet surface of the back sheet Bs. The electrolyte membrane 20S is a proton-conducting ion-exchange membrane formed of a solid polymer material such as, for example, a fluorine-based resin, and includes an electrolyte membrane having good conductivity in a wet condition. The back sheet Bs is formed so as to be peelable from the electrolyte membrane sheet 20S and is formed from a polymer, such as polyester (e.g., PET (polyethylene terephthalate) and PEN (polyethylene naphthalate)) and polystyrene, into a sheet having substantially the same width as the electrolyte membrane sheet 20S. The electrolyte membrane sheet 20S formed as mentioned above is rolled up together with the back sheet Bs to prepare the electrolyte membrane sheet roll 20R.

The first catalyst layer supporting sheet roll DR1 is rotated under the control of the control apparatus 400 so as to feed the first catalyst layer sheet 21S together with the first catalyst layer supporting sheet Ds1 toward the first transfer rollers 112. As shown in the side sectional view in FIG. 1, the first catalyst layer 21S is formed on the first catalyst layer supporting sheet Ds1 The first catalyst layer sheet 21S is an electrode catalyst layer formed by coating a conductive support, such as carbon particles (catalyst-supporting carbon particles) that support a catalyst such as platinum or a platinum alloy, with a proton-conductive ionomer. The first catalyst layer sheet 21S is formed in an elongated shape on the first catalyst layer supporting sheet Ds1 by continuously applying a catalyst ink with the catalyst supporting carbon particles and ionomers dispersed therein using an appropriate application device and then subjecting it to drying. The first catalyst layer sheet 21S is formed so as to have a narrower width than the sheet width of the first catalyst layer supporting sheet Ds1, as shown in the side sectional view in FIG. 1. The first catalyst layer supporting sheet Ds1 is peelable from the first catalyst layer sheet 21S that has been formed into a continuous sheet. The first catalyst layer supporting sheet Ds1 is rolled up with the first catalyst layer sheet 21S formed thereon and prepared as the first catalyst layer supporting sheet roll DR1.

When the sheets rolled up into the electrolyte membrane sheet roll 20R and the first catalyst layer supporting sheet roll DR1 are respectively fed, the back sheet Bs and the first catalyst layer supporting sheet Ds1 are fed toward the first transfer rollers 112 so that the electrolyte membrane sheet 20S and the first catalyst layer sheet 21S will be joined to each other.

The first transfer rollers 112 include a roller 112a and a roller 112b that oppose each other, wherein a joining part between these rollers serves as a transfer-pressing part. The roller 112a and the roller 112b are rotated in a reverse manner to each other under the control of the control apparatus 400 so as to draw the back sheet Bs supporting the electrolyte membrane sheet 20S and the first catalyst layer supporting sheet Ds1 supporting the first catalyst layer sheet 21S into the transfer pressing part so as to thereby transfer the first catalyst layer sheet 21S onto the electrolyte membrane sheet 20S and to further convey the resulting sheet in a downstream direction. It should be noted that a transfer pressing force applied by the roller 112a onto the roller 112b or a transfer pressing force applied by the roller 112b onto the roller 112a is controlled by the control apparatus 400. In the following description, a laminate body formed by laminating a plurality of sheets during the process of conveying the plurality of sheets in a laminated state will be referred to as "laminated sheets."

The first peeling roller 113 is rotated under the control of the control apparatus 400 so as to peel the first catalyst layer supporting sheet Ds1 from the laminated sheets and to feed the peeled first catalyst layer supporting sheet Ds1 toward a recovery roller 313. The first conveyance roller 114 arranged downstream of the first peeling roller 113 is rotated under the control of the control apparatus 400 so as to convey, while applying a tension to, the laminated sheets fed from the first peeling roller 113 toward the second peeling roller 117 arranged downstream thereof.

The second peeling roller 117 is rotated under the control of the control apparatus 400 so as to peel the back sheet Bs from the laminated sheets (constituted by the back sheet Bs, the electrolyte membrane sheet 20S and the first catalyst layer sheet 21S) and feed the peeled back sheet Bs toward a recovery roller 317. As a result of such peeling of the back sheet Bs, laminated sheets constituted only by the electrolyte membrane sheet 20S and the first catalyst layer sheet 21S are fed from the first catalyst layer transfer mechanism 110 toward the second catalyst layer transfer mechanism 120.

The second catalyst layer transfer mechanism 120 is arranged downstream of the first catalyst layer transfer mechanism 110 and has a mechanism for transferring the second catalyst layer sheet 22S onto the electrolyte membrane sheet 20S. The second catalyst layer transfer mechanism 120 includes a second catalyst layer supporting sheet roll DR2, second transfer rollers 122 and a second conveyance roller 125.

The second catalyst layer supporting sheet roll DR2 feeds the second catalyst layer supporting sheet Ds2, having the second catalyst layer sheet 22S supported thereon, toward the second transfer rollers 122, The second catalyst layer sheet 22S is joined with the electrolyte membrane sheet 203 of the laminated sheets conveyed from the first catalyst layer transfer mechanism 110 before a joining part of the second transfer rollers 122 and, in such state, drawn into the second transfer rollers 122. The second catalyst layer sheet 22S is an electrode catalyst layer formed by coating a conductive support (catalyst-supporting carbon particles) that supports a catalyst, such as platinum or a platinum alloy, with a proton-conductive ionomer. The second catalyst layer sheet 22S is formed on the second catalyst layer supporting sheet Ds2 by applying a catalyst ink with the catalyst supporting carbon particles and ionomers dispersed therein using an appropriate application device and then subjecting it to drying. As is obvious from FIG. 1, the second catalyst layer sheet 22S is formed intermittently on the second catalyst layer supporting sheet Ds2. The second catalyst layer supporting sheet Ds2 is peelable from the second catalyst layer sheet 22S. The second catalyst layer supporting sheet Ds2 is rolled up with the second catalyst layer sheet 22S formed thereon and prepared as the second catalyst layer supporting sheet roll DR2.

Similarly to the above-described first transfer rollers 112, the second transfer rollers 122 include a roller 122a and a roller 122b that oppose each other, wherein a joining part between these rollers serves as a transfer-pressing part. These rollers are rotated in a reverse manner to each other under the control of the control apparatus 400 so as to draw the second catalyst layer supporting sheet Ds2 from the second catalyst layer supporting sheet roil DR2 and the laminated sheets (constituted by the electrolyte membrane sheet 20S and the first catalyst layer sheet 21S) conveyed from the first catalyst layer transfer mechanism 110, in a state in which the second catalyst layer sheet 22S is joined with the electrolyte membrane sheet 20S, into the transfer pressing part so as to thereby transfer the second catalyst layer sheet 22S onto the electrolyte membrane sheet 20S. As a result of such transfer of the second catalyst layer sheet 22S, it is possible to obtain a sheet-shaped membrane electrode assembly Ms with an anode and a cathode joined onto the respective surfaces of the electrolyte membrane sheet 20S. The drawing of the sheets and the transfer pressing force caused by the second transfer rollers 122 are controlled by the control apparatus 400. The sheet-shaped membrane electrode assembly Ms with the anode and the cathode joined onto the respective surfaces of the electrolyte membrane is conveyed to the second conveyance roller 125 arranged downstream of the second transfer rollers 122 and then sent to for example, a fuel cell manufacturing line.

The control apparatus 400 is configured as a computer having a CPU, ROM, RAM, etc., for performing logic operations. The control apparatus 400 controls and adjusts the speed of rotation of each of the above-mentioned rollers.

<Manufacturing Steps of Membrane Electrode Assembly>

Figure 2:
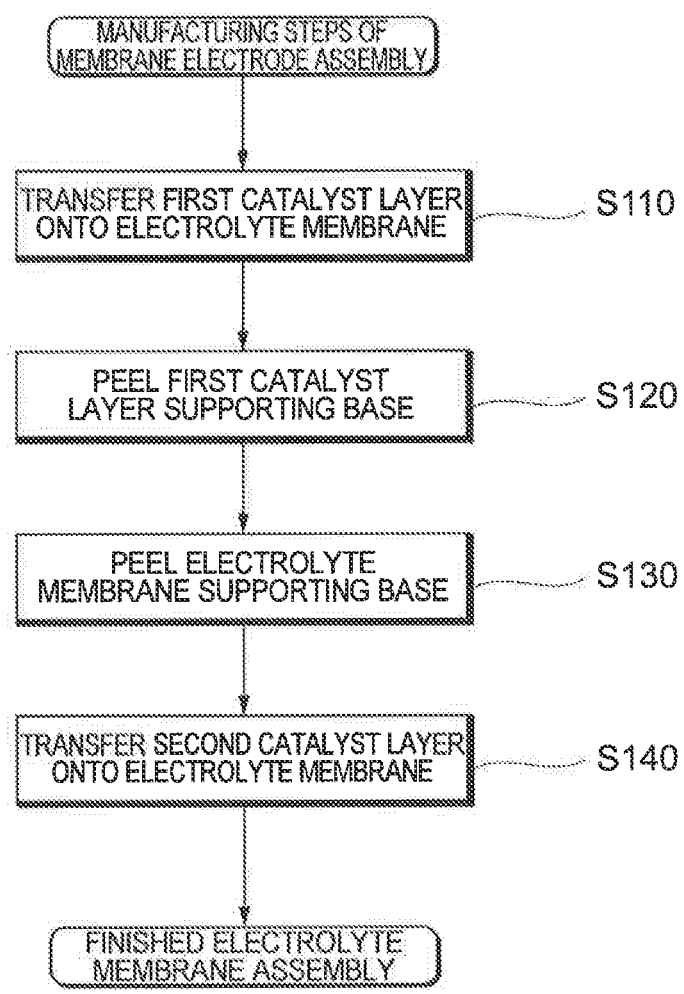
FIG. 2 is a flowchart showing an example of manufacturing steps of a membrane electrode assembly.

The following description will describe the manufacturing steps of a membrane electrode assembly using the manufacturing apparatus 1 for membrane electrode assemblies shown in FIG. 1. FIG. 2 is a flowchart showing an example of the manufacturing steps of a membrane electrode assembly.

(Step S110)

First, the back sheet Bs supporting the electrolyte membrane sheet 20S and the first catalyst layer supporting sheet Ds1 supporting the first catalyst layer sheet 21S are drawn into the transfer pressing part of the first transfer rollers 112 to transfer the first catalyst layer sheet 21S (first catalyst layer) onto the electrolyte membrane sheet 20S (electrolyte membrane) (Step S110).

(Step S120)

Next, the first catalyst layer supporting sheet Ds1 (first catalyst layer supporting base) is peeled from the laminated sheets conveyed from the first transfer rollers 112 by the first peeling roller 113 (step S120). The peeled first catalyst layer supporting sheet Ds1 is rolled up and recovered by the recovery roller 313. The laminated sheets from which the first catalyst layer supporting sheet Ds1 has been peeled (i.e., the laminated sheets constituted by the back sheet Bs the electrolyte membrane sheet 20S, and the first catalyst layer sheet 21S) are conveyed by the first conveyance roller 114, arranged downstream thereof, toward the second peeling roller 117 with the tension continuously applied thereto.

(Step S130)

The back sheet Bs (electrolyte membrane supporting base) is peeled from the laminated sheets (constituted by the back sheet Bs, the electrolyte membrane sheet 20S, and the first catalyst layer sheet 21S) by the second peeling roller 117 (step S130), The peeled back sheet Bs is recovered by the recovery roller 317. The laminated sheets from which the back sheet Bs has been peeled by the second peeling roller 117 is conveyed by the second transfer rollers 122 arranged downstream thereof.

(Step S140)

The laminated sheets (constituted by the electrolyte membrane sheet 20S and the first catalyst layer sheet 21S) conveyed from the second peeling roller 117 to the second transfer rollers 122 and the second catalyst layer supporting sheet Ds2 unrolled from the second catalyst layer supporting sheet roll DR2 are drawn into the second transfer rollers 122 to be subjected to transfer pressing. As a result, the second catalyst layer sheet 22S (second catalyst layer) is transferred onto the electrolyte membrane sheet 20S (electrolyte membrane) included in the laminated sheets (step S140). As a result of the transfer of the second catalyst layer sheet 22S, it is possible to obtain a sheet-shaped membrane electrode assembly Ms having an anode and a cathode joined onto the respective surfaces of the electrolyte membrane, The resulting sheet-shaped membrane electrode assembly Ms is conveyed by the second conveyance roller 125 arranged downstream of the second transfer rollers 122 with the tension continuously applied thereto.

It is possible to obtain the sheet-shaped membrane electrode assembly Ms through steps S110 to S140. The resulting membrane electrode assembly is sent to, for example, a fuel cell manufacturing line.

Next, the following description will describe a lead film FL and a lead film supporting base FS that are provided to an inner (innermost) mall end of the electrolyte membrane sheet roll 20R (electrolyte membrane roll body) in the above-described manufacturing apparatus 1 for membrane electrode assemblies.

Figure 3:
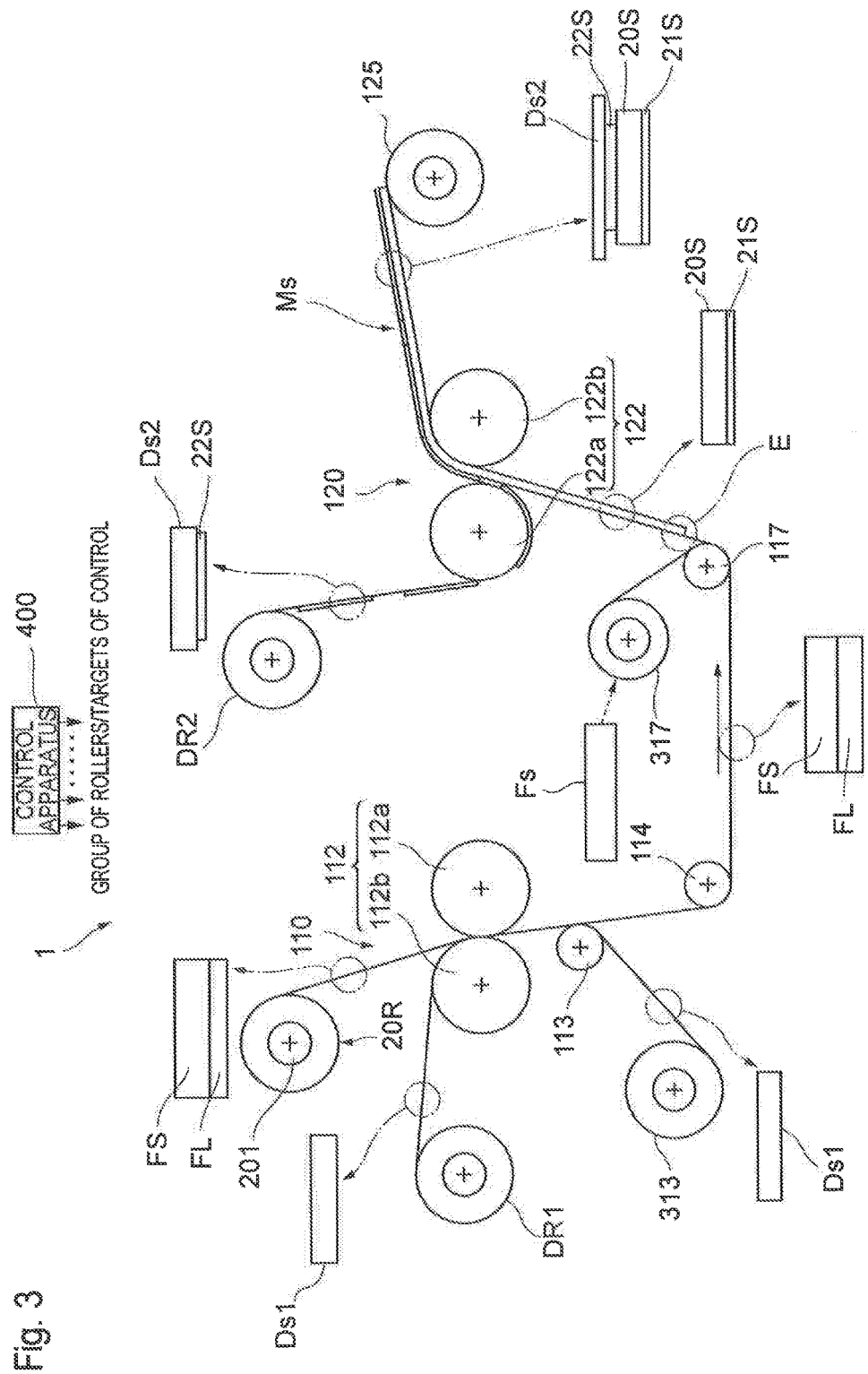
FIG. 3 is an explanatory diagram schematically showing the forms of sheets at respective sections during conveyance, as of when transfer is completed.
Figure 4:
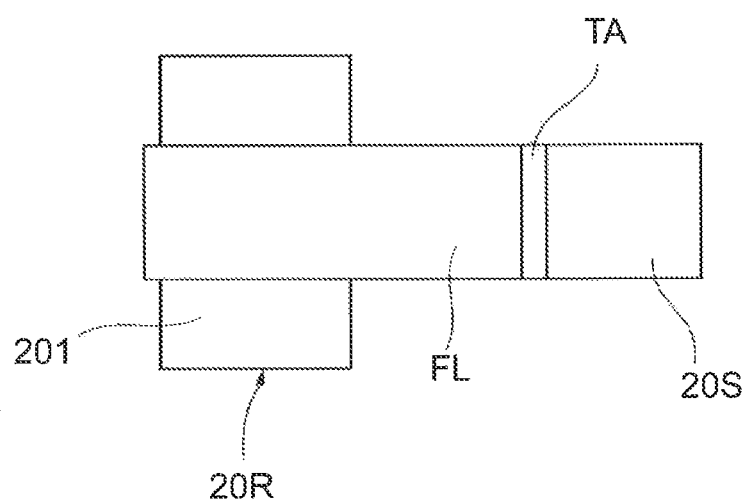
FIG. 4 is an explanatory diagram schematically showing a lead film that is connected at an inner roll end of an electrolyte membrane roll body.
Figure 5:
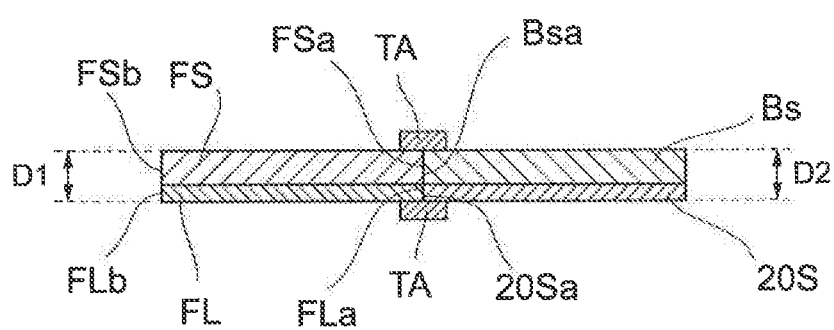
FIG. 5 is an explanatory diagram schematically showing a general configuration of a lead film and a lead film supporting base.

FIG. 3 is an explanatory diagram schematically showing the forms of sheets at respective sections during conveyance, at a time point after all the electrolyte membrane that has been rolled up into the electrolyte membrane roll body has been unrolled, i.e. as of when the transfer of the first catalyst layer onto the electrolyte membrane is completed (at the end of the transfer of the first catalyst layer). FIG. 4 is an explanatory diagram schematically showing the state of the inner roll end of the electrolyte membrane roll body. FIG. 5 is an explanatory diagram schematically showing a general configuration of a lead film and a lead film supporting base. It should be noted that the electrolyte membrane roll body is omitted from FIG. 5

As shown in FIGS. 4 and 5, a two-layered lead film (a lead film FL and a lead film supporting base FS bonded to the lead film FL) is connected to the roll core 201 of the electrolyte membrane sheet 20S rolled up into the electrolyte membrane sheet roll 20R. In other words, the two-layered lead film (the lead film FL and the lead film supporting base FS) is used as the inner (innermost) roll end of the electrolyte membrane sheet roll 20R. The lead film supporting base FS is peelably bonded onto the lead film FL. Since the lead film FL and the lead film supporting base FS are used as described above, after all the electrolyte membrane sheet 20S that has rolled up into the electrolyte membrane sheet roll 20R has been unrolled, the lead film FL and the lead film supporting base FS are fed from the electrolyte membrane sheet roll 20R as shown in FIG. 3. The thus-fed lead film FL and the lead film supporting base FS are conveyed as-is through the transfer rollers 112, the first peeling roller 113 and the first conveyance roller 114 to the second peeling roller 117, where the lead film supporting base FS is peeled by the second peeling roller 113. Since the lead film supporting base FS is bonded to a terminal end of the back sheet Bs as shown in FIG. 5, the lead film supporting base FS will be peeled after the back sheet Bs is peeled by the second peeling roller 117 (see FIG. 1).

FIG. 3 shows, as an example, a state in which the lead film FL is fed to the downstream of the second peeling roller 117, where the ends of the laminated sheets, shown in an alternate long and short dashed line circle E located downstream of the second peeling roller 117, represent the terminal ends of the electrolyte membrane sheet 20S and the first catalyst layer sheet 21S. As is obvious from the drawing, when the electrolyte membrane sheet 20S, the first catalyst layer sheet 21S and the second catalyst layer sheet 22S are used up, the lead film FL and the second catalyst layer supporting sheet Ds2 will be left behind in the equipment (in the manufacturing apparatus for membrane electrode assemblies), The configurations of the lead film FL and the lead film supporting base FS will now be described in further detail below. As shown in FIGS. 4 and 5, first ends of the lead film FL and the lead film supporting base FS are connected to the roll core 201 of the electrolyte membrane sheet roll 20R and the second ends thereof are connected to the electrolyte membrane sheet 20S and the back sheet Bs, respectively. More specifically, a first end FLb of the lead film FL and a first end Fsb of the lead film supporting base FS are connected to the roll core 201 of the electrolyte membrane sheet roll 20R, while the second end FLa of the lead film FL and the second end FSa of the lead film supporting base FS are connected to a terminal end (inner roll end) 20Sa of the electrolyte membrane sheet 20S and a terminal end (inner roll end) BSa of the back sheet Bs, respectively. The connecting portion between the second end FLa of the lead film FL and the terminal end 20Sa of the electrolyte membrane sheet 20S and the connecting portion between the second end FSa of the lead film supporting base FS and the terminal end Bsa of the back sheet Bs are bonded to each other using a peelable member (e.g., an adhesion tape TA). Since these connecting portions (the portions connected by the adhesion tape TA) can be peeled when the back sheet Bs is peeled, the lead film supporting base FS can be peeled after the peeling of the back sheet Bs.

Although the first end FLb of the lead film FL and the first end FSb of the lead film supporting base FS are connected to the roll core 201 in the present embodiment, the first end FLb is not limited to the terminal end of the lead film FL but may comprise an area in the vicinity of the terminal end of the lead film FL, In other words, the area in the vicinity of the terminal end of the lead film FS may be connected to the roll core 201. Similarly, the first end FSb of the lead film supporting base FS is not limited to the terminal end of the lead film supporting base FS but may comprise an area in the vicinity of the terminal end of the lead film supporting base FS. In other words, the area in the vicinity of the terminal end of the lead film supporting base FS may be connected to the roll core 201.

A suitable peeling strength of the lead film supporting base FS relative to the lead film FL may be 0.01 N/125 mm or more, and may be equal to or less than the peeling strength of the back sheet Bs relative to the electrolyte membrane sheet 20S. By setting such peeling strength, the occurrence of poor peeling can be suppressed and the conveyance can be carried out in a stable manner.

As shown in FIG. 5, assuming that the sum of the thickness of the lead film FL and the thickness of the lead film supporting base FS is D1 and the sum of the thickness of the electrolyte membrane sheet 20S and the thickness of the back sheet Bs is D2, it is preferable for D1 and D2 to be substantially equal to each other. Specifically, D1 is preferably within the range of D2+/−30 μm. As described above, by configuring the thicknesses of the lead film FL and the lead film supporting base FS so as to fall within a certain range, the electrolyte membrane sheet 20S connected to the lead film FL can be conveyed stably without causing wrinkling and without variations in dimension.

As described above, the electrolyte membrane sheet 20S and the back sheet Bs are not directly connected to the roll core 201 of the electrolyte membrane sheet roll 20R, but the electrolyte membrane sheet 20S and the back sheet Bs are connected to the roll core 201 via the lead film FL and the lead film supporting base FS that are connected to the roll core 201. Specifically, the first end FLb of the lead film FL and the first end FSb of the lead film supporting base FS are connected to the roll core 201, the second end FLa of the lead film FL is connected to the terminal end 20Sa of the electrolyte membrane sheet 20S, and the second end FSa of the lead film supporting base FS is connected to the terminal end Bsa of the back sheet Bs. The lead film supporting base FS and the back sheet Bs are bonded to each other by, for example, the adhesion tape TA and this adhesion tape TA is easily removable. Since the lead film FL and the lead film supporting base FS are provided as described above, it is possible that, when the terminal end of the back sheet Bs is peeled, only the back sheet Bs is peeled at the bonding portion between the back sheet Bs and the lead film supporting base FS and then the lead film supporting base FS is peeled. Consequently, the lead film FL connected to the roll core 201 can be left behind within the equipment (within the manufacturing apparatus 1 for membrane electrode assemblies). As a result, since the conveyance of the product itself will not become unable to continue, the zone in which the catalyst layer cannot be transferred onto the electrolyte membrane can be reduced and the electrolyte membrane in the equipment can be effectively utilized.

It should be noted that, as mentioned earlier, the present invention is not limited to the above embodiment and various modifications may be possible without departing from the gist of the invention.

For example, although the anode sheet is used as the first catalyst layer sheet 21S and the cathode sheet is used as the second catalyst layer sheet 22S in the above embodiment, the configuration is not limited thereto. It is only required that the anode sheet be joined onto one surface of the electrolyte membrane sheet 20S and that the cathode sheet be joined onto the other surface thereof, and the order of joining is not particularly limited. In addition, although the membrane electrode assembly described above has electrode catalyst layers on both surfaces of the electrolyte membrane, a membrane electrode assembly that includes a gas dispersion layer should also be encompassed in the scope of the present invention as a matter of course. Components of each specific example, as well as the arrangements, materials, conditions, shapes, sizes, etc should not be limited to those illustrated in the above description and may be changed as appropriate.

According to the present invention, it is possible to provide an electrolyte membrane roll body to be used in a manufacturing apparatus for membrane electrode assemblies which allows effective use of an electrolyte membrane in the manufacturing apparatus.

What is claimed is:

1. An electrolyte membrane roll body configured to be used in a manufacturing apparatus for producing membrane electrode assemblies that are formed by transferring an electrode catalyst layer onto at least one surface of a belt-shaped electrolyte membrane that is being continuously conveyed as the belt-shaped electrolyte membrane is unrolled from the electrolyte membrane roll body, the electrolyte membrane roll body comprising:

a lead film;

a lead film supporting base that is peelably bonded to the lead film, a first end of the lead film and a first end of the lead film supporting base being connected to a roll core of the electrolyte membrane roll body; and an electrolyte membrane supporting base supporting the belt-shaped electrolyte member, the belt-shaped electrolyte membrane and the electrolyte membrane supporting base being initially rolled around the roll core, and a terminal end of the belt-shaped electrolyte membrane and a terminal end of the electrolyte membrane supporting base being connected to a second end of the lead film at an opposite end of the lead film from the first end of the lead film and a second end of the lead film supporting base at an opposite end of the lead film supporting base from the first end of the lead film supporting base, respectively.

2. The electrolyte membrane roll body according to claim 1, wherein a peeling strength of the lead film supporting base relative to the lead film is equal to or less than a peeling strength of the electrolyte membrane supporting base relative to the belt-shaped electrolyte membrane.

3. The electrolyte membrane roll body according to claim 1, wherein a total thickness of the lead film and the lead film supporting base is substantially equal to a total thickness of the belt-shaped electrolyte membrane and the electrolyte membrane supporting base.

* * * * *